United States Patent Office 2,789,996
Patented Apr. 23, 1957

2,789,996
PREPARATION OF DIFUNCTIONAL COMPOUNDS

Ralph C. Schreyer, Wilmington, Del., assignor to E. I. du Pont de Nemours and Company, Wilmington, Del., a corporation of Delaware No Drawing. Application April 17, 1953, Serial No. 349,572

7 Claims. (Cl. 260—465.6)

This invention relates to a process for the preparation of certain unsaturated difunctional compounds by reaction between formaldehyde and unsaturated monofunctional compounds.

It has been known for many years that the lower olefins can react with formaldehyde and acetic acid in the presence of sulfuric acid to give 1,3-alkanediol esters (French Patent 717,712). It has also bee known for many years that highly reactive unsaturated compounds including styrene, anethole, and isosafrole, upon reaction with formaldehyde in the presence of acetic and sulfuric acids give not only the 1,3-alkanediol esters but also substituted 1,3-alkanediol cyclic formals as well (Prins, Chem. Weekblad 16, 1510–26 (1919)). Numerous acidic catalysts have been disclosed as being effective in the reaction between olefins and formaldehyde to form cyclic formals; for example, boron trifluoride and hydrated boron trifluoride were employed in the process disclosed in British patent 484,828, and U. S. Patents 2,135,454, 2,158,031, and 2,289,548; aqueous sulfuric acid, hydrochloric acid, phosphoric acid and zinc chloride were disclosed in U. S. 2,218,640. In U. S. Patent 2,426,017 and British Patent 590,571 numerous other catalysts for the reaction between olefins and formaldehyde were disclosed; these including formic acid, aqueous methyl formate, acidic clay-like materials, calcium sulfate, and the like. It has also been disclosed that when certain specific catalysts are employed, namely, zinc chloride, stannic chloride, silicon tetrachloride, zinc dichloroacetate, and the like, the reaction takes a different course and results in the formation of unsaturated monohydric primary alcohols (U. S. 2,308,192).

Moreover, it has been reported that certain tertiary olefin hydrocarbons can react with formaldehyde in the absence of an inorganic catalyst and particularly in the presence of an organic esterifying acid to produce monofunctional unsaturated alcohols or esters thereof (cf. U. S. 2,246,285, U. S. 2,335, 027, and Br. 657,497).

It has been discovered in accordance with the present invention that organic compounds having a $$CH_2=C(alkyl)—group$$

bonded to a radical of the class consisting of hydroxyalkyl, and cyanoalkyl groups react very readily with formaldehyde in the absence of a catalyst to produce the corresponding unsaturated difunctional compound as indicated in the following equations (1) 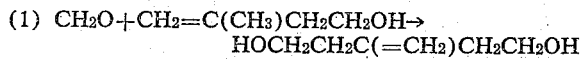

(2) 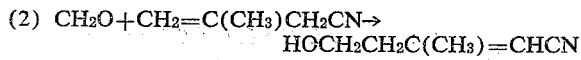

The formaldehyde which is employed in carrying out these reactions must be substantially anhydrous and must be present in the form which is produced by pyrolysis of paraformaldehyde. The reaction does not take place when the formaldehyde is in the form of aqueous formaldehyde, aqueous paraformaldehyde, or anhydrous trioxane. It is, of course, entirely possible that the paraformaldehyde which is initially present is converted to dry monomeric formaldehyde under the reaction conditions, and that the relatively high reactivity of the formaldehyde reactant may be due in part to the fact that it exists in the reaction mixture as substantially anhydrous formaldehyde. By "substantially anhydrous" is meant that the water content is no greater than is present in the monomeric formaldehyde produced by pyrolysis of ordinary paraformaldehyde. The process of the invention is best carried out at temperatures within the range of 150° to 350° C. under superatmospheric pressure. Excellent yields of difunctional unsaturated compounds are obtained under these reaction conditions.

The unsaturated organic compounds which may be employed as reactants in the practice of this invention include methallyl alcohol, 3-methyl-3-butene-1-ol, 3-methyl-1-cyano-3-butene, 2-ethylallyl alcohol, methallyl cyanide, etc. In general any organic compound having a $$CH_2=C(alkyl)$$

group, such as $CH_2=C(CH_3)—$, $CH_2=C(C_3H_7)—$, $CH_2=C(C_4H_9)$, etc., attached to a radical of the class consisting of hydroxyalkyl, and cyanoalkyl groups can be employed satisfactorily in the practice of this invention. When R is a cyanomethyl group, the difunctional monoolefinic reaction product, surprisingly, has a double bond in conjugation with the triple bond of the nitrile group, but where R is hydroxyalkyl, the double bond in the reaction product is frequently found in the position most remote from the hydroxyl groups.

The process of this invention can be carried out in any suitable pressure resistant vessel. If desired, the reactants can be passed under high pressure through a tubular reaction vessel at a temperature within the range hereinabove specified, and the difunctional compound can be separated from the resulting product by simple distillation. The reaction vessel if desired may be made or lined with relatively inert materials such as copper, silver, glass, or the like. The pressure within the reaction vessel can be controlled if desired by means of an outlet valve and in this manner suitable superatmospheric pressures in the range of about 50 to 1500 atmospheres can be maintained rather satisfactorily.

The invention is illustrated further by means of the following examples.

*Example 1.*—A mixture consisting of 7.5 grams paraformaldehyde and 86 grams of 3-methyl-3-butene-1-ol was heated in a stainless steel autoclave for one hour at a temperature of 200° to 205° C. Four such runs were made and the products were combined and distilled yielding 178 grams of recovered starting material, 25 grams of crude 3-methylene-1,5-pentanediol having a boiling range of 95° to 110° C. at 1 mm. ($n_D^{25}=1.4739$) and 18 grams of additional 3-methylene-1,5-pentanediol boiling at 110–113° C. under a pressure of 1 mm. ($n_D^{25}=1.4751$).

The 3-methyl-3-butene-1-ol which was employed as a reactant in this example can be made by heating paraformaldehyde with isobutylene for 3 hours at 198° to 205° C. in an autoclave (mol ratio isobutylene:HCHO= 2:1) and distilling the resulting mixture. This product has a boiling point of 126° to 133° C. (cf. U. S. 2,355,-027).

*Example 2.*—A mixture consisting of 15 grams paraformaldehyde and 81 grams of methallyl cyanide was heated in a stainless steel autoclave for three hours at a temperature of 200° to 207° C. The product after removal from the autoclave was distilled yielding 50 grams of methallyl cyanide and 18 grams of a product which had a boiling point of 105° C. at 1.5 mm. ($n_D^{25}=1.4851$, percentage N=12.48, hydroxyl number 596; calculated values for 5 - hydroxy - 3 - methyl-2-pentene nitrile:percentage N=12.61, hydroxyl number=506. The infra red spectrum of this product showed the absence of a methylene group and the presence of a methyl group and in addition bands corresponding to a conjugated nitrile, and a primary hydroxyl group. On this basis the compound present in the fraction was 5-hydroxy-3-methyl-2-pentene nitrile.

Example 3.—A mixture of 15 grams paraformaldehyde and 109 grams 5-methyl-5-hexenenitrile

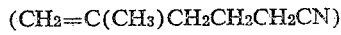
$(CH_2=C(CH_3)CH_2CH_2CH_2CN)$ was heated at 200–204° C. for 3 hours in a stainless steel autoclave under autogenous pressure. The discharged liquid product was distilled directly to give 80 grams of recovered 5-methyl-5-hexenenitrile and 15.5 grams of a fraction, B. P. 118° C. at 1.5 mm. ($n_D^{25}$=1.4695). Calcd. for $C_8H_{13}NO$: N, 10.07. Found: N, 9.43. Infra red spectrum of this material showed bands that correlated with primary hydroxyl and unconjugated nitrile, from which it can be deduced that the product was 7-hydroxy-5-methylene heptanenitrile of the formula

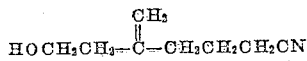
$$HOCH_2CH_2-\overset{\overset{CH_2}{\|}}{C}-CH_2CH_2CH_2CN$$

A charge of 25 grams 7-hydroxy-5-methylene-heptanenitrile (prepared as just described), 54 grams ammonia and 10 grams of Raney nickel was hydrogenated at 108–111° C. and 5000 p. s. i. pressure for one hour in a stainless steel autoclave. The resulting product was filtered to remove catalyst and distilled to give 15.5 grams of a fraction, B. P. 92–93° C. at 0.2–0.3 mm. ($n_D^{26}$=1.4836). Calcd. for $C_8H_{17}NO$: N, 9.79; N. E. 143. Found: N, 9.64; N. E. 150. Infra red spectrum of this hydroxyamine showed bands that correlated with primary hydroxyl, amine and methylene, corresponding to the following structure:

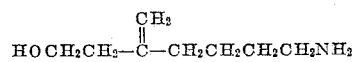
$$HOCH_2CH_2-\overset{\overset{CH_2}{\|}}{C}-CH_2CH_2CH_2CH_2NH_2$$

It is to be understood that the foregoing examples are illustrative only and that numerous modifications of the invention will occur to those who are skilled in the art.

It is noteworthy that the rate of conversion depends somewhat upon the pressure and that increased rates can be achieved by employing rather high superpressures. However, the reaction is sufficiently rapid at pressures in the range of 50 to 1500 atmospheres that it is generally not necessary to employ still higher pressures. It is to be understood that the ratio of ingredients can be varied rather widely and that there is no necessity for employing the ratios illustrated in the specific examples. For optimum yields it is generally desirable to employ an excess of the unsaturated reactant, the preferred range of unsaturated ingredients to formaldehyde, on a mol basis, being from about 1.5:1 to 5:1.

The products are highly valuable in the manufacture of condensation polymers which can be cross-linked through their unsaturated linkages. They are also valuable as intermediates for the synthesis of unsaturated amino alcohols which in turn are valuable intermediates in the manufacture of condensation polymers. Exhaustive hydrogenation of the products obtained in the practice of the invention gives rise to saturated difunctional compounds such as dihydroxyl alkanes and alkanol amines.

The methods which may be employed for converting the products of this invention to above-mentioned useful hydrogenation products are similar to those which are effective in carrying out the hydrogenations of compounds having a somewhat similar structural relationship between olefinic bonds and the functional groups. For example, if it is desired to convert 3-methylene-1,5-pentanediol to 3-methyl-1,5-pentanediol this can be accomplished in dioxane solution through the use of a Raney nickel catalyst at a temperature of about 100° under a pressure of about 5000 lbs./sq. in. The 3-methyl-1,5-pentanediol thus obtained has a boiling point of 95° to 100° C. under a pressure of 0.2 to 0.4 mm. ($n_D^{25}$=1.4502;

di-p-nitrobenzoate ester, M. P. 74° to 76° C.; percent N found 6.79, calcd. 6.73). The infra red spectrum of this compound showed that only one methyl side group was present. This eliminated the possibility that two formaldehyde units had condensed on the same carbon atom to give 2-isopropenyl-1,3-propanediol.

The unsaturated difunctional compounds obtained by the process of the invention can be converted to useful cyclic compounds in those instances in which the number of carbon atoms separating the functional groups is not too large. For example, the distillation of a mixture of 25 grams 3-methylene-1,5-pentanediol and 25 grams fused potassium acid sulfate gave 14 cc. of a heterogeneous mixture having a boiling range of 80° to 100° C. The upper layer (about 10 cc.) was separated and redistilled to give 2.6 grams of 4-methylene-tetrahydropyran, which had a boiling point of 117° to 120° C. and a refractive index ($n_D^{29}$) of 1.4435.

I claim:

1. A process for the synthesis of difunctional compounds which comprises heating a reaction mixture initially consisting essentially of an unsaturated reactant of the formula $CH_2=C(alkyl)-R$, wherein R is a member of the class consisting of hydroxyalkyl and cyanoalkyl groups, and paraformaldehyde, under substantially anhydrous conditions and in the absence of added catalyst, at a temperature of at least 200° but not in excess of 350° C. under superatmospheric pressure, and thereafter separating from the resulting mixture a difunctional reaction product having monoolefinic unsaturation, and having a terminal $HOCH_2CH_2$-group, formed by reaction of formaldehyde with the terminal methylene group in the said unsaturated reactant.

2. A process for the synthesis of dihydroxy alkenes which comprises heating a reaction mixture initially consisting essentially of formaldehyde and a compound of the formula $CH_2=C(CH_3)-R$, wherein R is a hydroxyalkyl group, under substantially anhydrous conditions and in the absence of any added catalyst at a temperature of at least 200° but not in excess of 350° C. under superatmospheric pressure, and thereafter separating from the resulting mixture a dihydroxy alkene of the formula $HOCH_2CH_2C(=CH_2)-R$ produced by the ensuing reaction.

3. The process which comprises heating a reaction mixture initially consisting essentially of paraformaldehyde with 3-methyl-3-butene-1-ol under substantially anhydrous conditions and in the absence of added catalyst at a temperature of at least 200° but not in excess of 350° C. under superatmospheric pressure and thereafter separating 3-methylene-1-5-pentanediol from the resulting mixture.

4. 3-methylene-1,5-pentanediol.

5. The process which comprises heating a reaction mixture initially consisting essentially of paraformaldehyde with methallyl cyanide under substantially anhydrous conditions in the absence of added catalyst at a temperature of at least 200° but not in excess of 350° C. under superatmospheric pressure and thereafter separating 5-hydroxy-3-methyl - 2 - pentenenitrile from the resulting product.

6. 5-hydroxy-3-methyl-2-pentenenitrile.

7. The process of claim 1 wherein the said pressure is within the range of 50 to 1500 atmospheres.

References Cited in the file of this patent

UNITED STATES PATENTS

| | | |
|---|---|---|
| 2,335,027 | Ritter | Nov. 23, 1943 |
| 2,386,586 | Braut et al. | Oct. 9, 1945 |
| 2,426,017 | Hamblet et al. | Aug. 19, 1947 |
| 2,735,863 | Price | Feb. 21, 1956 |

OTHER REFERENCES

Price et al.: J. A. C. S., vol. 74 (1952), pp. 2987–91.